March 1, 1932. B. L. CHAFEE 1,847,471
HOLDING DEVICE
Filed March 25, 1931

INVENTOR:
B. L. Chafee
BY H. J. Sanders
ATTORNEY

Patented Mar. 1, 1932

1,847,471

UNITED STATES PATENT OFFICE

BERTHA L. CHAFEE, OF MIDDLETOWN, CONNECTICUT

HOLDING DEVICE

Application filed March 25, 1931. Serial No. 525,131.

This invention relates to improvements in holding devices and more particularly to mixing bowl holders. It is customary when using a mixing bowl or chopping bowl, in the preparation of food or the like, to hold or steady the bowl with one hand while the other hand performs the mixing or chopping operation. This imposes a severe strain upon the user and frequently results in tipping the bowl over, spilling its contents and generally impeding the work. By the use of the present device both hands may be employed to perform the mixing or chopping operation.

A further object is to provide a mixing bowl holder wherein the bowl-engaging devices, two or more in number, may be caused to exert holding pressure upon the bowl simultaneously and likewise to so relieve such pressure thus preventing the accidental tipping over of the bowl, that is, while the bowl-engaging devices may be applied singly they are caused to apply holding pressure to the bowl simultaneously, and to relieve such pressure simultaneously.

A further object is to provide a holding device of this type wherein the direct bowl-engaging devices are adjustable about the bowl without varying the amount of pressure each exerts upon the bowl and without the danger of any bowl-engaging device slipping from its position.

A still further object is to provide a device of this type that is positive and efficient in operation, cheap to manufacture and durable in use. With the foregoing and other objects in view the invention consists in the combination and arrangement of parts to be hereinafter fully described, pointed out in the claims and illustrated in the accompanying drawings which forms a part of this application for patent and in which—

Like reference characters denote corresponding parts throughout the several views.

Figure 1:
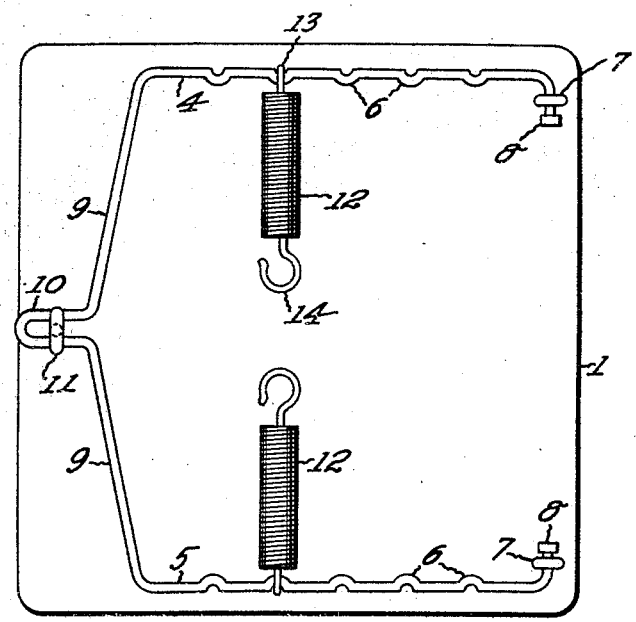
Fig. 1 is a top plan view of the holding device.
Figure 2:
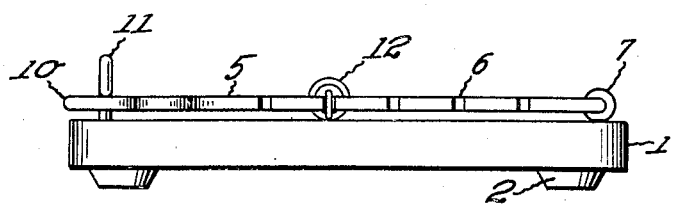
Fig. 2 is a view of Fig. 1 in side elevation.
Figure 3:
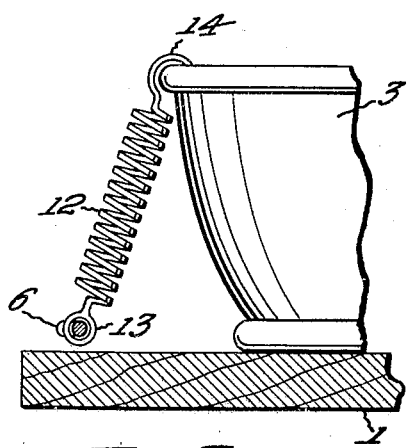
Fig. 3 is an enlarged fragmentary sectional view of the holding device illustrating its application.

The holding device comprises a base block or plate 1 preferably of rectangular formation and provided with the feet 2, said plate being adapted to freely receive the mixing or chopping bowl 3. A frame of wire, or like material, having parallel sides 4, 5 each formed with a plurality of notches 6 and having their free ends bent inwardly or toward each other and extending through keepers 7 carried by the plate 1 and terminating in buttons 8 is provided, said frame at its opposite end being bent inwardly from said sides to form the shoulders 9 connected by the integral handle portion 10 which is formed preferably about midway between the sides 4, 5.

A screw-eye or loop-headed screw 11 is secured to the plate 1 between the sides of the handle 10, the distance between the sides of said handle being less than the diameter of the head of the screw-eye so that in the position of the latter member shown the handle 10 may be releasably secured to the plate by the screw-eye. By turning the screw-eye 11 to a position at right angles to that shown, or until its head portion is parallel with the handle the latter may be readily raised clear of the screw-eye. The inwardly bent terminations of the frame are held against removal from the plate by the said buttons 8.

Adjustably carried by the sides 4, 5 of the frame are the coiled springs 12, each being provided with an eye-forming terminal 13 movable along a frame side, and with one hooked end 14 for direct engagement with the rim or edge of the bowl 3. With the frame in raised position, relative to the plate 1, the springs 12 are engaged with the bowl. The frame is now lowered and its handle 10 placed in engagement with the screw-eye 11 thus causing the two or more springs 12 to exert pressure upon the bowl to hold the same firmly in position upon the plate 1. To release the bowl the handle 10 of the frame is disengaged and raised until the pressure of the springs 12 upon the bowl is relieved. The springs 12 may be held in adjusted position about the bowl by the notches 6 that receive the spring terminals 13.

What is claimed is:—

1. In a bowl holder, a base block, a frame pivotally secured thereto, a locking screw for releasably securing said frame to said block against pivotal movement in one position, and resilient bowl-engaging means adjustably carried by said frame.

2. In a bowl holder, a base block, a frame having its ends pivotally secured to said block, a handle at the non-pivoted end of said frame, a locking screw for releasably securing said handle to said block in one position of said handle, and resilient bowl-engaging means adjustably carried by said frame.

3. In a bowl holder, a base block, a frame having notched sides and inwardly bent ends pivotally secured to said block, a handle at the non-pivoted end of said frame, a locking screw for releasably securing said handle to said block in one position, and springs adjustably carried by said notched frame sides for releasable engagement with the rim of the bowl.

In testimony that I claim the foregoing as my own I have hereto affixed my signature.

BERTHA L. CHAFEE.